United States Patent [19]
Gresko et al.

[11] Patent Number: 6,133,939
[45] Date of Patent: Oct. 17, 2000

[54] CATV DIRECTIONAL COMPONENT WITH SIGNAL REVERSING CAPABILITY AND METHOD

[75] Inventors: Richard Gresko, Huntingdon Valley; Raymond W. Alker, Philadelphia, both of Pa.

[73] Assignees: Motorola, Inc., Schaumburg, Ill.; General Instrument Corporation, Horsham, Pa.

[21] Appl. No.: 09/228,141

[22] Filed: Jan. 11, 1999

[51] Int. Cl.[7] .............................. H04N 7/14; H04N 1/00; H01P 5/12; H01R 9/05

[52] U.S. Cl. .............................. 348/12; 348/13; 455/5.1; 333/100; 333/136; 439/579

[58] Field of Search ..................... 348/12, 13; 455/5.1, 455/3.1; 333/100, 127, 128, 136; 439/579

[56] References Cited

U.S. PATENT DOCUMENTS

| | | | |
|---|---|---|---|
| 4,578,702 | 3/1986 | Campbell, III | 358/86 |
| 5,635,881 | 6/1997 | Romerein et al. | 333/101 |
| 5,781,844 | 7/1998 | Spriester et al. | 455/3.3 |
| 5,835,844 | 11/1998 | Stoneback et al. | 455/5.1 |
| 5,892,653 | 4/1999 | Nishimuta et al. | 361/643 |
| 5,945,634 | 8/1999 | Shimirak et al. | 174/71 C |

*Primary Examiner*—Andrew I. Faile
*Assistant Examiner*—Kieu-Oanh Bui
*Attorney, Agent, or Firm*—Volpe and Koenig, P.C.

[57] ABSTRACT

The present invention describes a directional CATV component, preferably a signal tap, having a housing frame where coaxial signal cable connections are made allowing for tap circuitry to be placed on either side of the housing frame. The invention allows for the rapid exchange of tap circuitry between front and rear positions providing for the reversal of signal frequency direction. The signal tap comprises a housing frame, a back cover with a support clamp and a signal tap cover containing a plurality of female F-connectors. Loss circuitry is mounted on a PC board that is attached to the tap cover.

11 Claims, 7 Drawing Sheets

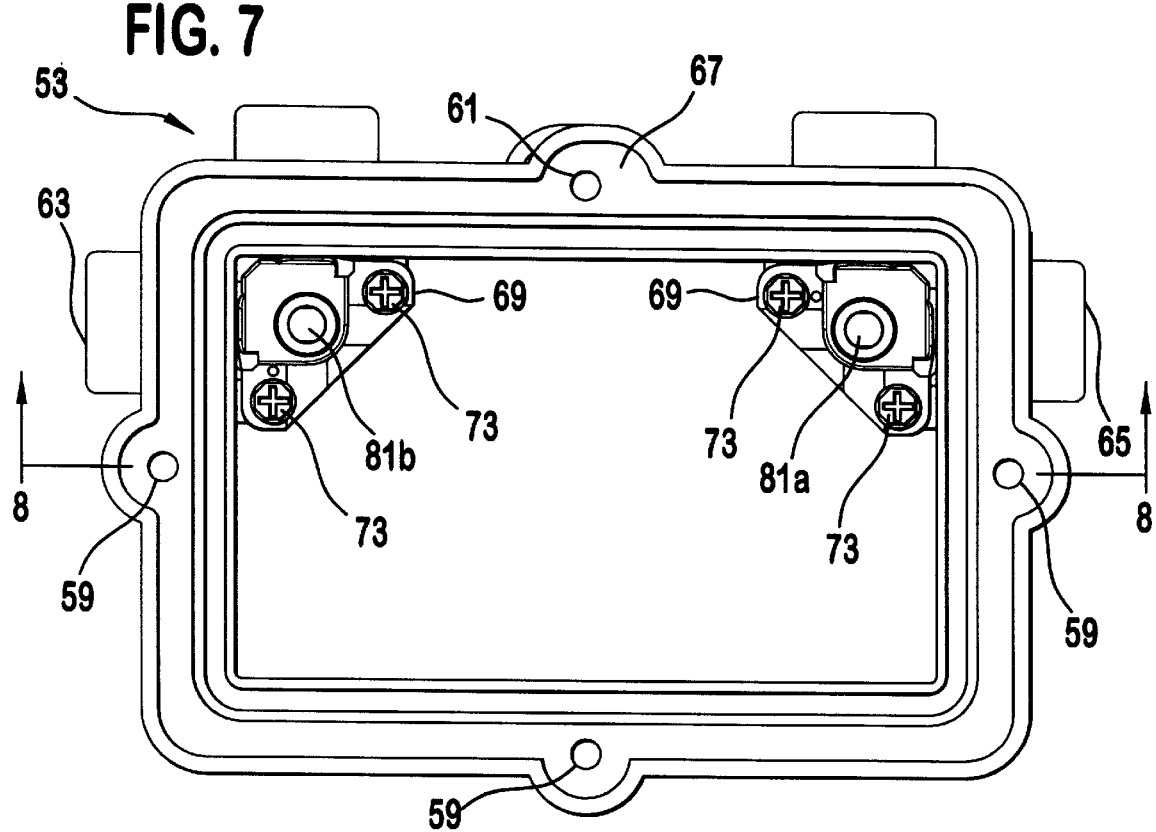
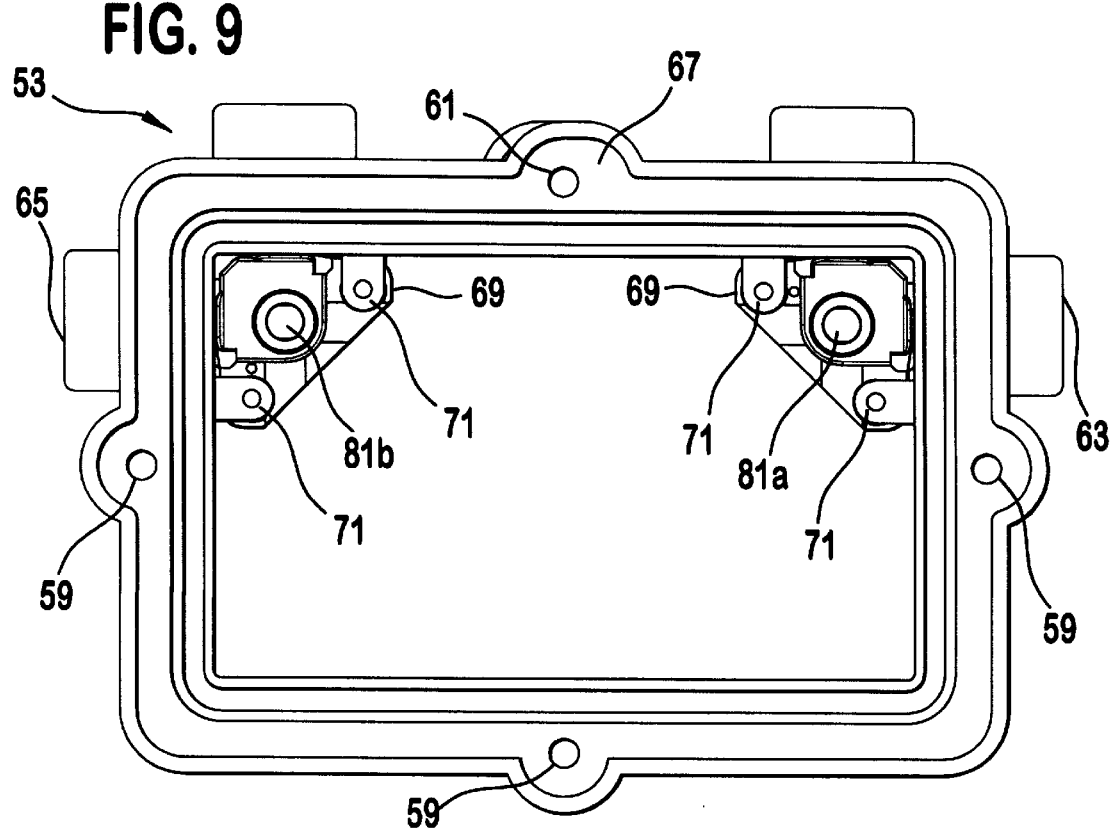

CATV DIRECTIONAL COMPONENT WITH SIGNAL REVERSING CAPABILITY AND METHOD

BACKGROUND OF THE INVENTION

1. Field of the Invention

This invention relates generally to cable television communication system passive distribution components. More particularly, the invention relates to a signal tap having a housing frame which allows for signal distributing circuitry to be interchanged from either side of the housing frame thereby easily reversing signal direction without disconnection from the CATV coaxial signal cable.

2. Description of the Prior Art

Cable television (CATV) services are provided to customers through a transmission network that typically includes a trunk system transporting a plurality of CATV services from a headend to smaller branches and then onto individual subscriber drops. The transmission medium for the branch and subscriber drops is usually coaxial cable. The transmission network typically includes active and passive components, i.e., line amplifiers, cable taps, cable splitters, and other equipment to distribute the CATV services.

At a subscriber location, the coaxial cable is interrupted with a signal tap which distributes the CATV services to a number of individual subscribers. The signal tap is connected to the coaxial cable using F-connectors and is supported by the cable support strand or a pedestal.

A block diagram of a cable television network 15 is shown in FIG. 1. The coaxial cable 17 functions as a transmission line to provide CATV services 19 to a number of subscribers 21 at various locations. Each subscriber 21 receives signals through the individual taps 23 placed on the coaxial cable 17. Each tap 23 may provide multiple connections.

A prior art signal tap 23 is shown in FIG. 2. The tap 23 includes a body 25, a tap cover 27, a printed circuit board 29 with loss circuitry and asymmetrical connectors 31. The tap cover 27 is provided with a plurality of tap outlets 33, each providing service to a different subscriber 21. The body 25 includes threaded, female F-connector signal input 35 and output 36 ports at opposing ends for connection to the CATV distribution cable 17. The body 25 includes an integral support strand clamp 39 cast in place.

The CATV signal 19 is routed through the printed circuit board 29 rigidly attached to the inside surface of the cover 27 with a plurality of signal tap terminals 41 passing through the cover 27. A pair of signal receptors 43a, 43b are provided on the back of the printed circuit board 29. The printed circuit board 29 distributes the signal received from the headend 19 to subscribers 21 coupled to that tap 23 and passes the signal through to the output connector 36. Since subscriber tap 23 loss circuitry 29 is directional with regard to predetermined frequency bandwidths and the location of the headend, the signal has to enter the input receptor 43a and exit the output receptor 43b in the direction indicated on the tap cover 27. A detailed explanation of the function of the loss circuitry 29 is beyond the scope of the present invention. A metal braid and flexible gasket surrounds the periphery of the tap cover 27 to provide a seal for weather and EMI/RFI ingress.

The tap cover 27 and the printed circuit board 29 are secured to the main body 35 by a plurality of cover bolts at various connection points 45. Upon engagement of the cover, the pair of receptors 43a, 43b engage the connectors 31 thereby completing the circuit and maintaining continuity from the input connector 35 through the printed circuit board 29 distributing the signal to each signal tap 33 and to the output signal port 36 to other downstream subscribers 23.

Periodically, when CATV distribution systems are modernized or rebuilt to higher frequency specifications, the origin of the signal may change necessitating the reversal of the signal connections for each signal tap. As shown in FIG. 3, to reverse frequency direction 50, the coaxial cable connections 47a, 47b on the signal tap 23 must be broken and the tap 23 removed from the support strand 49. The tap 23 must be turned 180 degrees and reconnected to the coaxial cable connections 47a, 47b and support strand 49. By breaking the connections to the coaxial cable 17, potential damage to the connectors 47a, 47b may result.

It is desirable to have a signal tap that easily allows the reversal of signal direction without needing to break the coaxial cable connections.

SUMMARY OF THE INVENTION

The present invention provides a CATV signal tap having a housing frame where the external coaxial signal cable connections are made allowing for the tap circuitry to be placed on either side of the frame effecting a reversal of signal direction without breaking the CATV coaxial signal cable connections. The signal tap comprises a housing frame, a back cover with an integral support clamp and a signal tap cover with a plurality of female F-connectors. The loss circuitry is mounted on a PC board that is affixed internal to the signal tap cover. The present invention allows for the rapid exchange between the signal tap cover and rear cover allowing easy signal direction reversal.

Accordingly, it is an object of the invention to provide a signal tap which allows for easy signal direction reversal.

It is a further object of the invention to obviate breaking the external CATV coaxial signal cable connections for a signal tap if signal direction reversal is desired.

Other objects and advantages of the invention will become apparent to those skilled in the art after reading the detailed description of the preferred embodiment.

BRIEF DESCRIPTION OF THE DRAWINGS

FIG. 7 is a front elevation view of the housing frame showing the seizure posts in position.

FIG. 9 is a rear elevation view of the housing frame showing the seizure posts in position.

DESCRIPTION OF THE PREFERRED EMBODIMENTS

Figure 1:
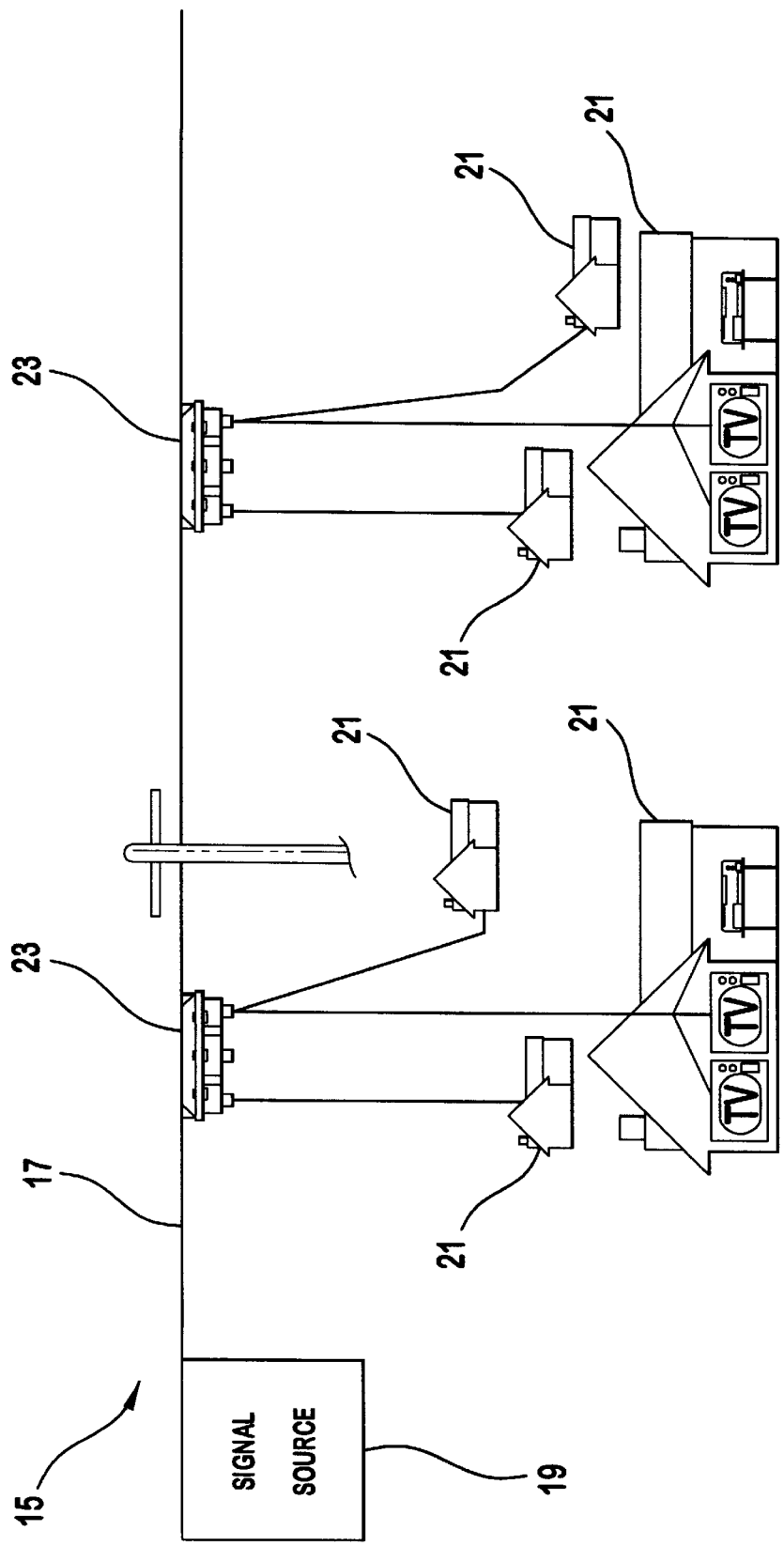
FIG. 1 is a system block diagram of a typical cable television subscriber feed.

The preferred embodiment will be described with reference to the drawing figures where like numerals represent like elements throughout.

Figure 4:
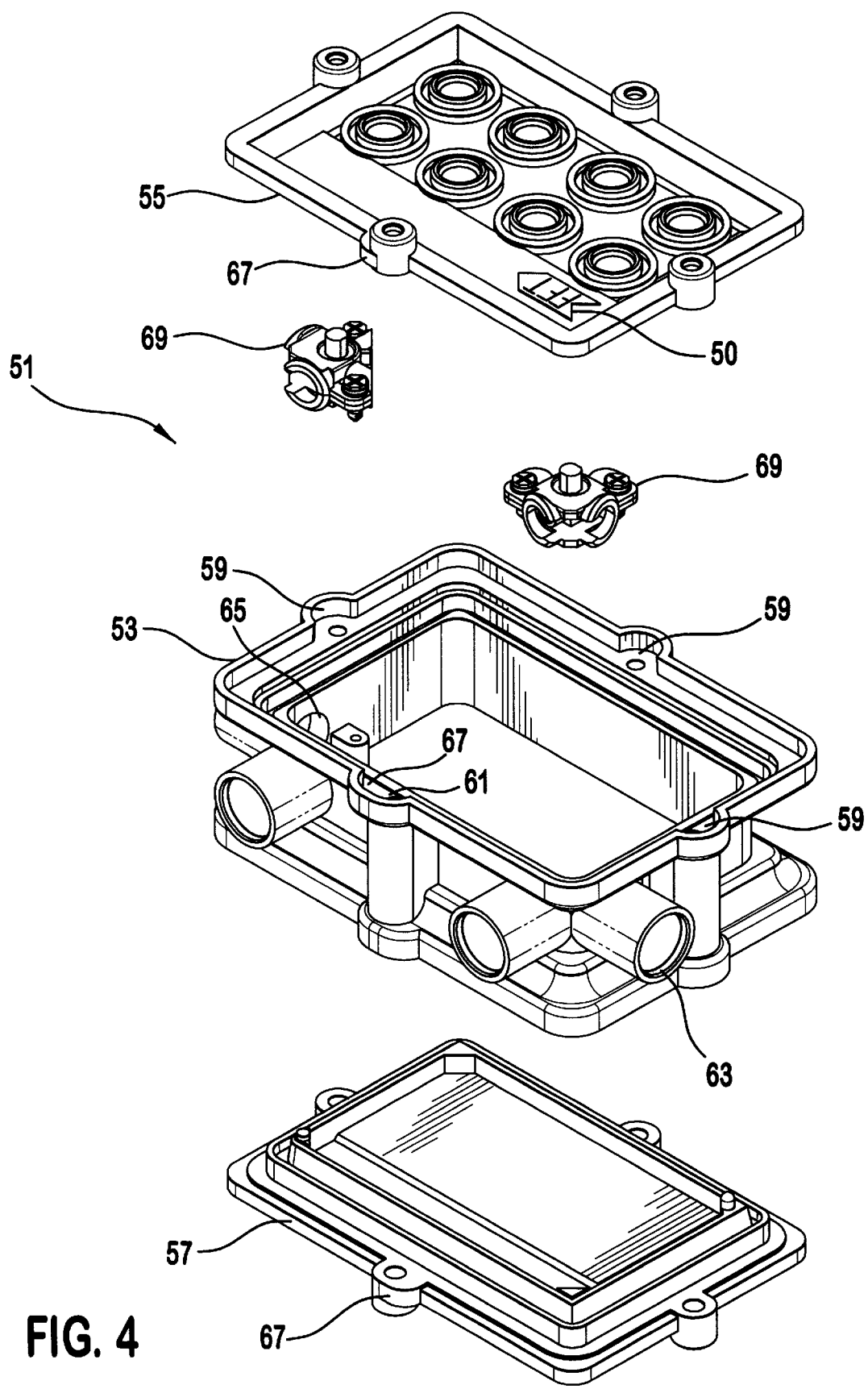
FIG. 4 is an exploded perspective view of the present invention.

The present invention 51 is shown in FIGS. 4–9. Referring to FIG. 4, the signal tap 51 includes a housing frame 53, a signal tap cover 55 and a rear cover 57. The signal tap cover 55 has signal distribution circuitry rigidly attached (not shown). The rear cover 57 has an integral cast support bracket (not shown) for aerial (strand) or pedestal support. Each side of the housing frame 53 of the signal tap 51 is symmetric with respect to the mounting holes 59 for the front 55 and rear 57 covers allowing for either cover 55, 57 to be placed on either side of the housing frame 53. The mounting hole 61 located between the input 63 and output 65 coaxial cable connectors is offset 67 such that the front 55 and rear covers 57 can only be mounted to the housing frame 53 in one orientation.

As can be seen in FIG. 4, the front 55 and rear covers 57 may be interchanged freely thereby allowing for rapid signal direction 50 reversal. In conjunction with the covers mating to either side of the housing frame 53, internal seizure posts 69 similarly provide symmetric engagement from either side of the housing frame 53 (see FIGS. 7 and 9).

Figure 2:
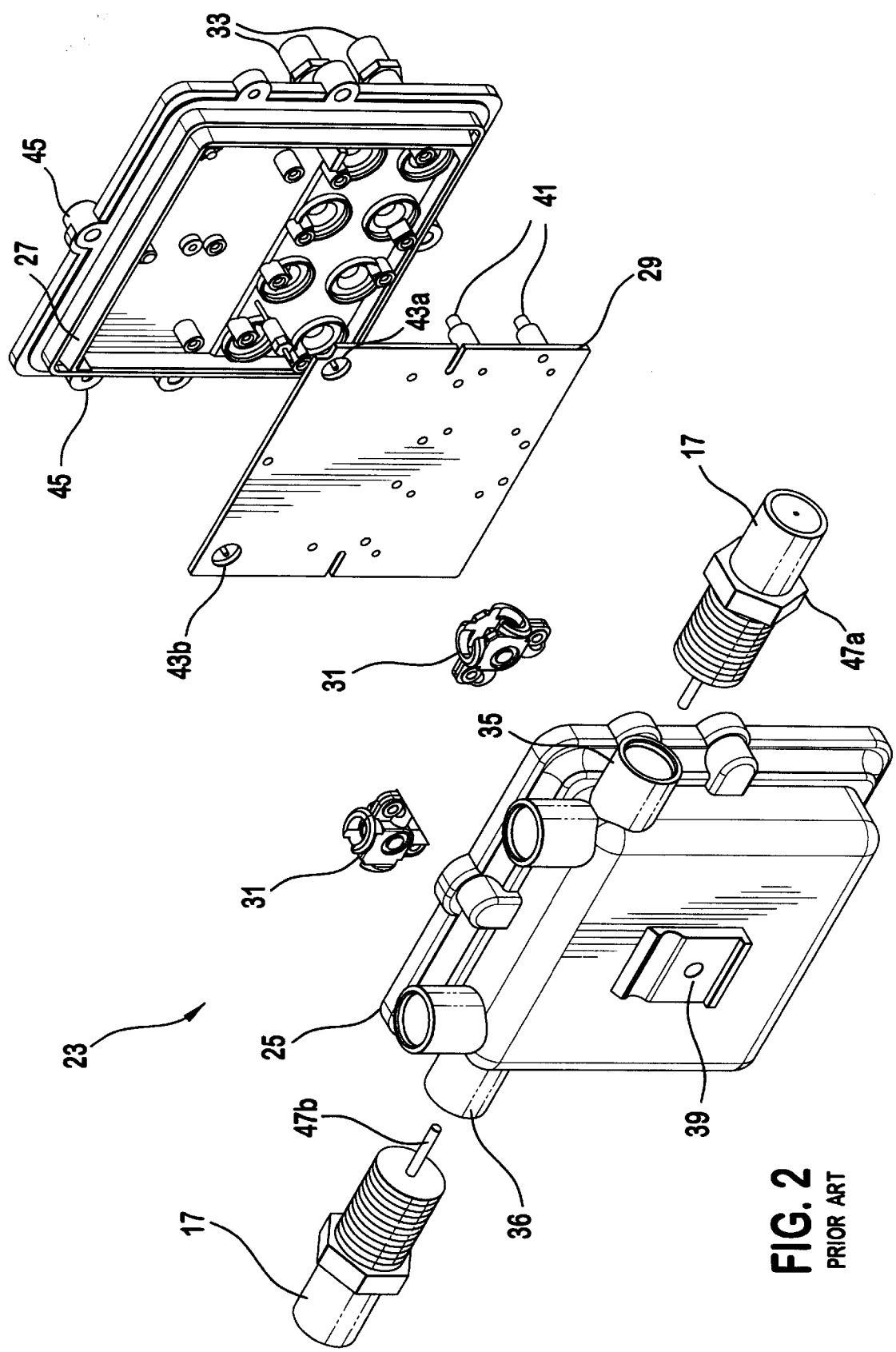
FIG. 2 is an exploded perspective view of a prior art signal tap.
Figure 3:
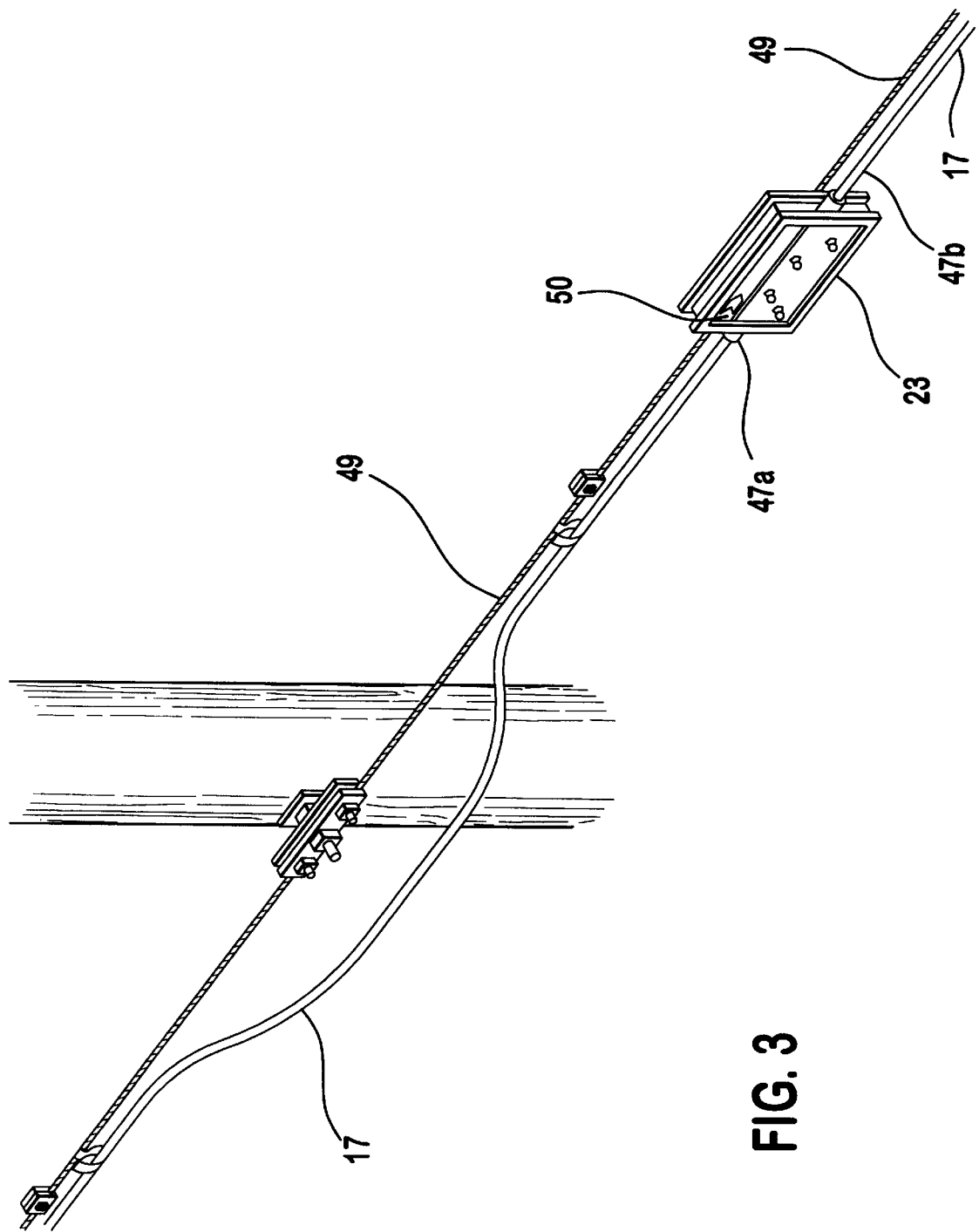
FIG. 3 is a perspective view of a signal tap suspended on a support strand.
Figure 5:
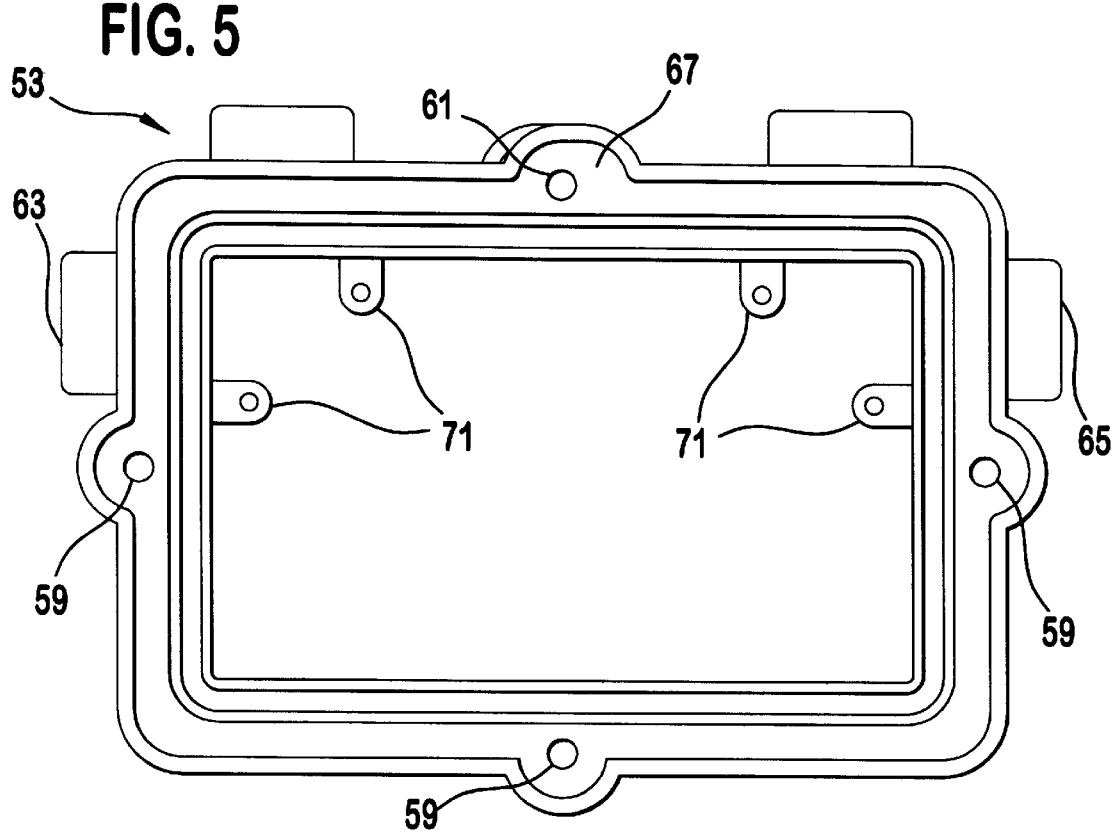
FIG. 5 is a front elevation view of the housing frame for the present invention.

Referencing FIG. 5, tapped mounting blocks 71 integrally cast with the housing frame 53 support the symmetric seizure posts 69. The seizure posts 69 are secured to the mounting blocks 71 with machine screws 73. The seizure posts 69 are used to couple the CATV coaxial cable 17 F-connectors 47*a*, 47*b* and provide mating engagement and circuit continuity with the PC board 29 (shown in FIG. 2).

Figure 8:
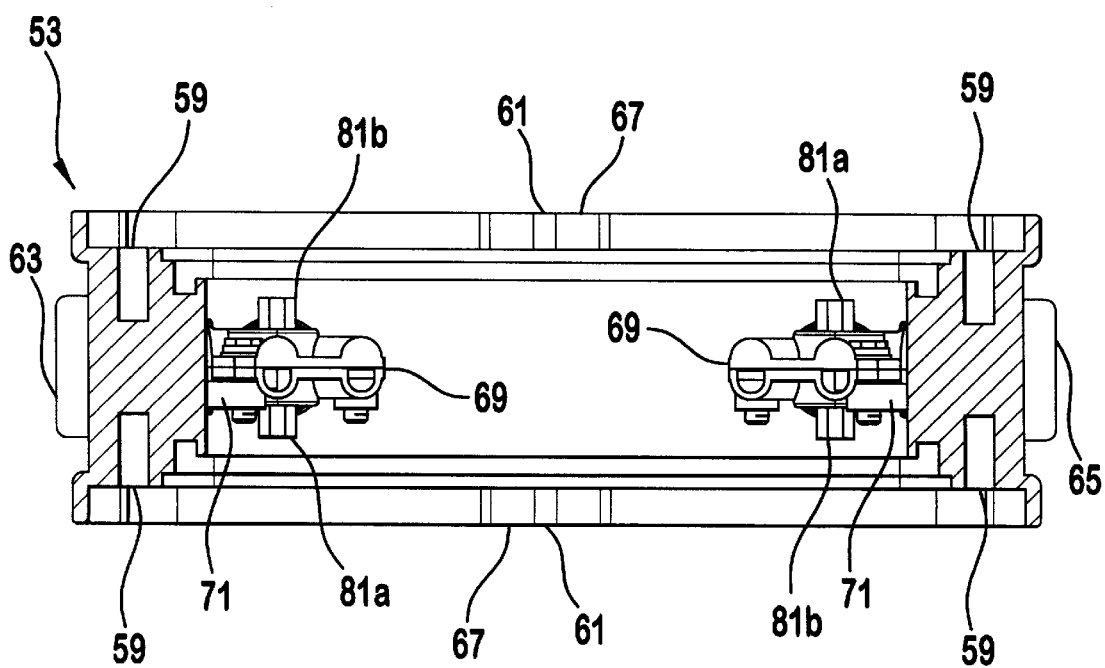
FIG. 8 is a cross sectional view along line 8—8 in FIG. 7.
Figure 6:
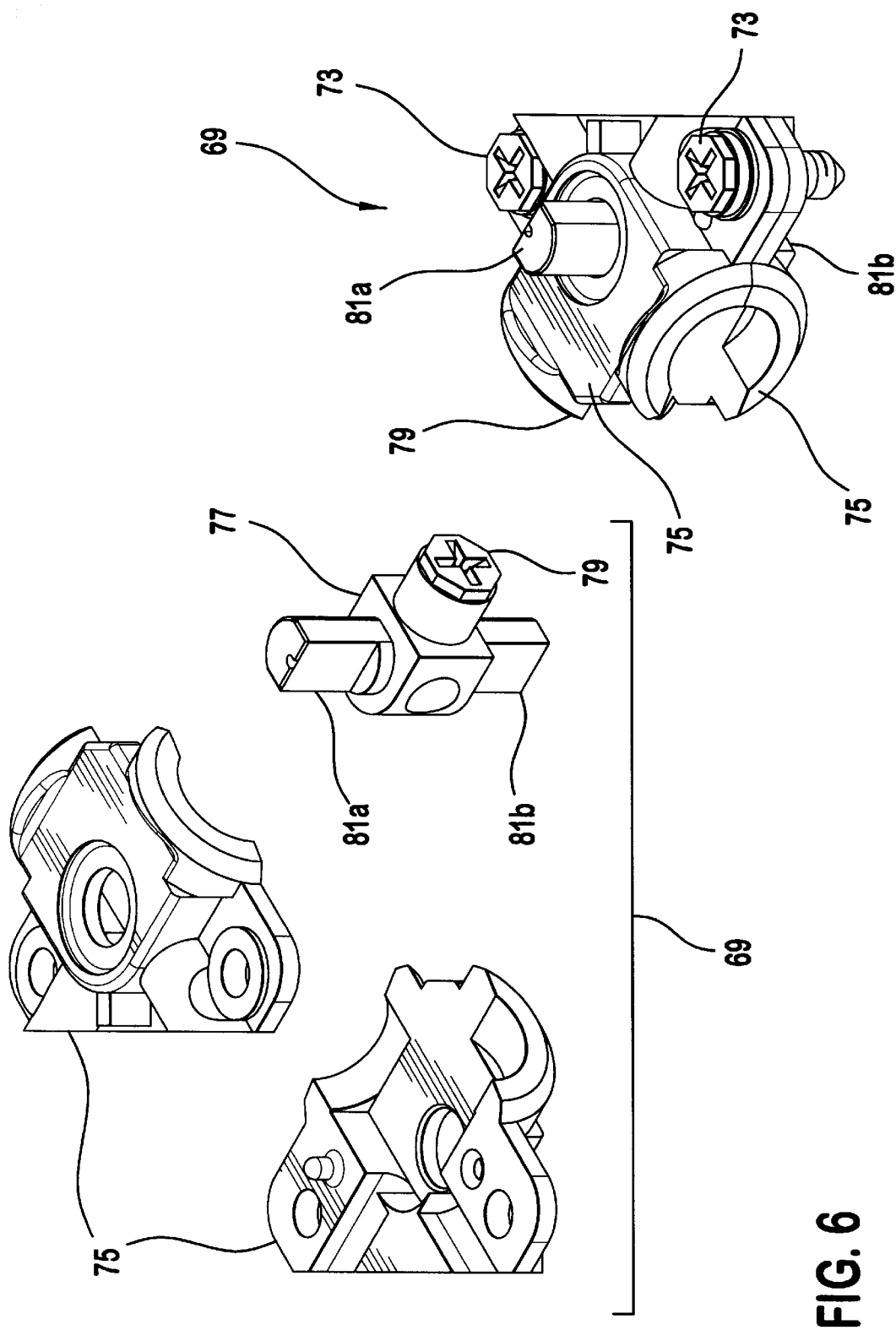
FIG. 6 is an exploded perspective view of a seizure post.

As shown in FIG. 6, the seizure post 69 includes a split insulator 75 and a conducting clamp arrangement 77 that includes a screw hold-down 79 which captures the center conductor of the CATV coaxial cable 17 F-connector 47*a*, 47*b*. Symmetric female connectors 81*a*, 81*b* extending beyond the insulating body 75 engage with male input 43*a* and output 43*b* signal receptors located on the PC board 29 (shown in FIG. 2). The female connectors 81*a*, 81*b* allow for mating engagement on either side of the housing frame 53 as shown in FIG. 8. Referencing FIGS. 7 and 9, the front view and rear view of the tap housing frame 53 with the seizure posts secured to the housing frame show that the seizure posts provide mating engagement on either side of the housing frame 53 with the PC board signal receptors 43*a*, 43*b*. The present invention 51 allows for the rapid exchange of the tap (front) and rear covers reversing signal 50 direction.

While the present invention has described in terms of the preferred embodiment, other variations which are within the scope of the invention as outlined in the claims below will be apparent to those skilled in the art.

What is claimed is:

1. A directional component for distributing directional rf signals impressed on a coaxial cable that allows for frequency direction reversal comprising:

a housing frame having first and second signal ports each for either the input or output of a directional rf signal;

each signal port having an internal coupling means;

a signal tap subcomponent having at least one external tap outlet and having an input receptor and an output receptor for operative association with the internal coupling means of said first and second signal ports; and said internal coupling means of said first and second signal ports configured for operative association with said input and output receptors of said signal tap subcomponent to provide a first mounting position where said input receptor is coupled to said first signal coupling means and said output receptor is coupled to said second signal port coupling means and a second mounting position where said input receptor is coupled to said second signal port coupling means and said output receptor is coupled to said first signal port coupling means.

2. The directional component according to claim 1 wherein each of said coupling means further comprise:

a symmetrical seizure post having a split insulator and a conducting clamp; and said conducting clamp having a screw hold-down for capturing a center conductor of the coaxial cable.

3. The directional component according to claim 2 wherein said housing frame further comprises two open sides and said signal tap subcomponent seals one open side of said housing frame and a cover seals said open housing frame side not covered by said signal tap subcomponent.

4. A directional signal distributing component used in conjunction with rf signals impressed on a coaxial cable that allows for frequency direction reversal comprising:

a housing frame having first and second signal ports each for either the input or output of a directional rf signal;

each signal port having an internal coupling means; and said internal coupling means of said first and second signal ports configured for operative association with input and output receptors of a directional subcomponent to provide a first mounting position where the subcomponent input receptor is coupled to said first signal port coupling means and said output receptor is coupled to said second signal port coupling means and a second mounting position where the subcomponent input receptor is coupled to said second signal port coupling means and the subcomponent output receptor is coupled to said first signal port coupling means.

5. The directional signal component according to claim 4 wherein said housing frame has two open sides further comprising a directional subcomponent mounted in one of said mounting positions and sealing one open side of said housing frame and a cover mounted in sealing engagement over the other open housing frame side.

6. The directional signal component according to claim 4 wherein each of said coupling means further comprise:

a symmetrical seizure post having a split insulator and a conducting clamp; and said conducting clamp having a screw hold-down for capturing a center conductor of the coaxial cable.

7. The directional signal component according to claim 6 wherein said housing frame has two open sides further comprising a directional subcomponent mounted in one of said mounting positions and sealing one open side of said housing frame and a cover mounted in sealing engagement over the other open housing frame side.

8. A method of reversing the frequency direction of a directional component for distributing directional rf signals impressed on a coaxial cable which includes a housing frame having first and second signal ports and a directional subcomponent having an input and an output signal receptor, the method comprising the steps of:

providing first and second symmetrical couplings, said couplings individually associated with the first and second ports, respectively, and having the subcomponent input receptor coupled to said first coupling and the subcomponent output receptor coupled to said second coupling whereby said first port functions as an input of the directional component and said second port functions as an output of the directional component;

decoupling the directional subcomponent from said first and second couplings; and recoupling the directional subcomponent such that the subcomponent input receptor is coupled to said second coupling and the subcomponent output receptor is coupled to said first coupling whereby the second port functions as an input for the directional component and the first port functions as an output for the directional component.

9. The method according to claim 8 wherein a first coaxial cable is coupled to the first port and a second coaxial cable is coupled to the second port and the steps of the method are conducted without decoupling said coaxial cables.

10. The method according to claim 8 wherein the housing frame has first and second open sides and the subcomponent is in sealing engagement with one of said open sides when the subcomponent receptors are coupled with said couplings, further comprising:

providing a sealing cover sealingly mounted over the housing open side opposite the side covered by the subcomponent when the subcomponent input receptor is coupled to said first coupling and the subcomponent output receptor is coupled to said second coupling;

removing said sealing cover; and mounting said sealing cover over the housing open side opposite the side covered by the directional subcomponent when the subcomponent input receptor is coupled to said second coupling and the subcomponent output receptor is coupled to said first coupling.

11. The method according to claim 10 wherein a first coaxial cable is coupled to the first port and a second coaxial cable is coupled to the second port and the steps of the method are conducted without decoupling said coaxial cables.

* * * * *